Figure 1:
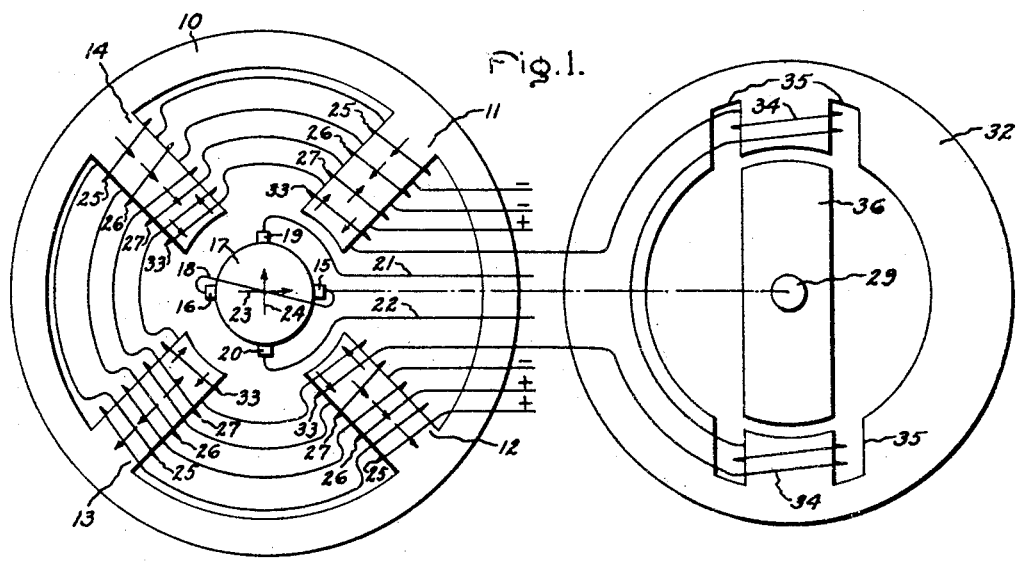

Jan. 12, 1943.  F. W. MERRILL  2,307,785
DYNAMO-ELECTRIC MACHINE
Filed March 20, 1941

Inventor:
Frank W. Merrill,
by Harry E. Dunham
His Attorney.

Patented Jan. 12, 1943

2,307,785

UNITED STATES PATENT OFFICE 2,307,785

DYNAMOELECTRIC MACHINE

Frank W. Merrill, Fort Wayne, Ind., assignor to General Electric Company, a corporation of New York Application March 20, 1941, Serial No. 384,231

7 Claims. (Cl. 171—223)

My invention relates to direct-current, commutator type dynamo-electric machines wherein the armature reaction of the machine provides a source of excitation thereto, and more particularly to an arrangement for minimizing the effects of residual magnetism and hysteresis in such machines.

A direct-current machine of the armature reaction excitation type is a dynamo-electric machine provided with a rotor or armature having a winding formed with coils connected to a commutator of the conventional direct-current type. The stationary member of such a machine usually is arranged to provide a path of low magnetic reluctance to the magnetic flux set up by the armature currents, and generally is provided with various windings to improve or control the operation of the machine. The basic principle of operation of my machine is similar to that of the Rosenberg generator in that it depends upon the armature reaction flux produced by current flowing between two sets of brushes for providing the desired characteristics of the machine. By providing special field exciting windings on the stationary member, this type dynamo-electric machine may be made to provide a controllable variable voltage and variable current characteristic obtaining very high rate of response and high amplification ratio. These features are of particular importance when such a machine is used to control other electrical apparatus, as in regulator and exciter systems. In order to obtain these desirable features, the machine is provided with a control field winding or windings having very small inductance and another field exciting winding arranged to neutralize or compensate for the normal armature reaction produced by the load or secondary current of the machine. I have found that residual magnetism and hysteresis in such a machine often impair the operation thereof.

An object of my invention is to provide a dynamo-electric machine having an improved construction for minimizing the effects of residual magnetism and hysteresis.

Another object of my invention is to provide an improved armature reaction excitation type dynamo-electric machine having an auxiliary field exciting winding energized in such a manner as to minimize the effects of residual magnetism and hysteresis in the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 2:
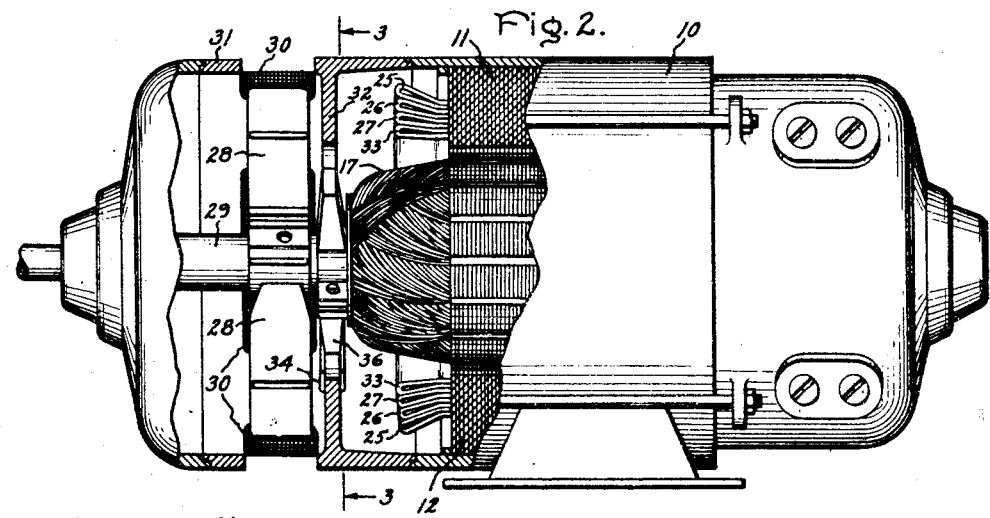
Figures 3, 4:
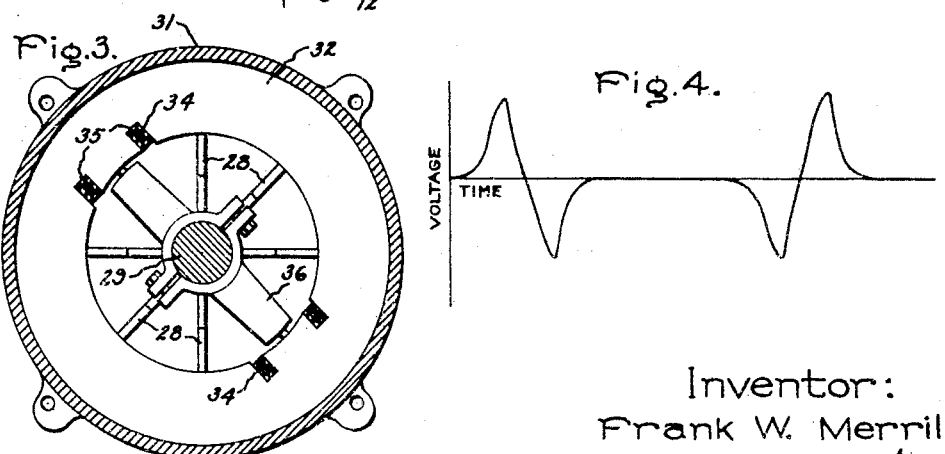

In the drawing, Fig. 1 is a schematic diagram illustrating a dynamo-electric machine provided with my invention; Fig. 2 is a side elevational view of a dynamo-electric machine partly broken away to show the construction embodying my invention; Fig. 3 is a sectional view taken along line 3—3 of Fig. 2; and Fig. 4 is a diagram showing the voltage characteristic generated in the auxiliary armature winding shown in Figs. 1 and 3.

Referring to the drawing, I have shown an armature reaction excited dynamo-electric machine provided with a stationary member 10 of magnetic material having pole pieces 11, 12, 13, and 14 adapted to provide a path of low magnetic reluctance for the armature reaction flux of the machine. The characteristics of this type machine are based fundamentally on the voltages induced in the armature by armature reaction excitation produced by currents flowing in the armature winding. The rotatable member or armature of this machine is of the conventional direct-current type, and is adapted to be driven at substantially constant speed by any suitable source of mechanical power. In order to provide the desired armature reactions, a set of primary brushes 15 and 16 is arranged to provide a primary circuit through the armature 17, and these brushes are short-circuited by an external conductor 18. A set of secondary brushes 19 and 20 is arranged to contact the commutator of the armature 17 and is electrically displaced thereabout from the primary brushes 15 and 16 to provide a secondary circuit through the armature, which is adapted to be connected to an external load circuit by conductors 21 and 22. With this brush arrangement, a very small amount of flux is required to induce a voltage between the primary brushes to build up a relatively large primary current through that part of the armature winding which is connected between these brushes. This primary current will produce a component of magnetic excitation or primary armature reaction along the primary commutating axis of the machine as indicated by the arrow 23. As the armature rotates, the conductors which are connected between the secondary brushes 19 and 20 will cut the primary armature reaction flux and a voltage will be induced between these brushes. When a load circuit is connected to these secondary brushes, a secondary or load current will flow through the secondary circuit of the armature and a secondary armature reaction will be produced along the commutating axis of these brushes as indicated by the arrow 24.

In order to control the secondary or load characteristics of this machine, a field exciting winding 25 is arranged to provide a component of magnetic excitation along the secondary commutating axis of the machine as indicated by the arrows in Fig. 1. As shown, the resultant excitation provided by this winding on the four pole pieces acts in a direction opposite to the secondary armature reaction 24, and is adapted to induce an electromotive force in the armature winding between the primary brushes 15 and 16. Any suitable means may be provided to vary the energization of this winding to control the excitation thereof and thereby control the voltage induced between the primary brushes. As explained in Alexanderson and Edwards Patent No. 2,227,992, the sensitivity and speed of response of the machine to variations in the energization of the control field exciting winding 25 is increased by providing a compensating field exciting winding 26 arranged to provide a component of excitation which is substantially equal and opposite to the secondary armature reaction 24. This winding 26 is adapted to provide a component of excitation in a direction as indicated by the arrows in Fig. 1 proportional to the secondary armature current by connecting the winding 26 in series with one of the secondary brushes 19 or 20. By such an arrangement, the excitation provided by the compensating field exciting winding 26 substantially neutralizes the magnetic back coupling of electric current in the secondary circuit of the armature with the primary circuit by substantially neutralizing the armature reaction flux along the secondary axis. In certain applications, it is desirable to reduce the primary short circuit current without reducing the resultant primary excitation. A field exciting winding 27 is adapted to be energized as shown in Fig. 1 to provide a component of excitation as indicated by the arrows in this figure in substantially the same direction as the primary armature reaction 23. An analysis of the excitation provided by the field exciting windings 25, 26, and 27 shows that while these windings are arranged on four pole pieces, each is adapted to provide two resultant poles, so that there are one-half as many primary poles and one-half as many secondary poles as the number of salient pole pieces on the stationary member of the machine.

In order to provide an arrangement for cooling the dynamo-electric machine, a ventilating impeller fan 28 is mounted on the shaft 29 of the rotatable member 17 of the machine and is adapted to draw ventilating air through the machine over the windings of the stationary and rotatable member to cool the same and to expel this air through a plurality of openings 30 formed in a housing 31. In order further to increase the cooling of the machine, the housing 31 is provided with an annular radially extending baffle 32 which is arranged to direct the ventilating air downwardly and inwardly toward the rotatable member of the machine.

The accuracy of the control of this type of dynamo-electric machine can be increased by minimizing the effect of residual magnetism and hysteresis in the machine by providing a demagnetizing auxiliary field exciting winding 33 arranged on the salient pole pieces of the machine so as to provide alternately reversed polarity to adjacent pole pieces, thereby minimizing the inductance effect of this auxiliary set of field exciting windings with the other field exciting windings of the machine. I have found that the effectiveness of the demagnetizing auxiliary field exciting winding 33 is greatly improved by energizing it with a variable electric current having a peaked wave form. Such an energization may be provided by any suitable conventional device, such as a peaked wave form transformer, but I have found that the effectiveness of this auxiliary field exciting winding may be further improved if it is energized by an interrupted alternating voltage of peaked wave form as shown in Fig. 4. This energization can be provided by an auxiliary armature winding 34 having a relatively small arcuate span with the coil sides arranged in slots 35 formed in the housing baffle 32. In order to provide a path of low magnetic reluctance to the magnet fluxes of the auxiliary armature winding 34, the baffle 32 and the housing 31 are formed of magnetic material and the efficiency of the winding 34 is further improved by arranging two sets of coils thereof at substantially diametrically opposite sides of the baffle 32 as shown in Figs. 1 and 3. A voltage of alternating interrupted peaked wave form as shown in Fig. 4 is induced in the auxiliary armature winding 34 by a rotatable relatively narrow permanent magnet pole piece field member 36 mounted on the shaft 29, so as to be driven by the rotatable member 17 of the dynamo-electric machine, and thereby operates in a predetermined speed relationship to the speed of the machine. In this manner, the baffle 32 of the fan housing provides an auxiliary stationary armature core member which assists in directing the ventilating air for more efficiently cooling the main machine, and, in addition, provides for the efficient cooling of the auxiliary armature winding 34. I have found that by providing this field exciting winding arrangement, it is possible to obtain greater accuracy in the control of the characteristics of this type dynamo-electric machine and that this construction provides a very efficient cooling arrangement for the machine.

While I have illustrated and described a particular embodiment of my invention, modifications thereof will occur to those skilled in the art. I therefore desire it to be understood that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a stationary member and a rotatable member provided with a winding and a commutator connected thereto, means including a primary set of commutator brushes and a secondary set of commutator brushes displaced from said primary brush set for providing a primary circuit and a secondary circuit respectively through said rotatable member, a control field exciting winding arranged on said stationary member to provide the same polarity to pairs of adjacent poles, auxiliary field exciting windings on said stationary member arranged to provide successively arranged poles of alternately reversed polarity, and means for energizing said field exciting windings with a variable electric current having a peaked wave form for minimizing the effects of residual magnetism and hysteresis on said machine.

2. A dynamo-electric machine having a stationary member provided with salient pole pieces and a rotatable member provided with a winding and a commutator connected thereto, means including a primary set of commutator brushes and a secondary set of commutator brushes displaced from said primary brush set for providing a primary circuit and a secondary circuit respectively through said rotatable member, a control field exciting winding arranged on said stationary member to provide the same polarity to pairs of adjacent poles, auxiliary field exciting windings on said stationary member pole pieces arranged to provide alternately reversed polarity to adjacent pole pieces, and means for energizing said field exciting windings with an alternating electric current having a peaked wave form for minimizing the effects of residual magnetism and hysteresis in said machine.

3. A dynamo-electric machine having a stationary member and a rotatable member, a ventilating medium impeller driven by said rotatable member, a housing of magnetic material arranged about said impeller and having an annular radially extending baffle arranged between said rotatable member and said impeller for directing ventilating medium inwardly towards said rotatable member, a field exciting winding on said stationary member, an auxiliary armature winding magnetically associated with said housing baffle, means including a rotatable field member arranged to excite magnetically said auxiliary armature winding for generating a voltage of peaked wave form in said auxiliary armature winding, and means connecting said auxiliary armature winding to said field exciting winding for minimizing the effects of residual magnetism and hysteresis in said machine.

4. A dynamo-electric machine having a stationary member and a rotatable member, a ventilating medium impeller driven by said rotatable member, a housing arranged about said impeller and having an annular radially extending baffle of magnetic material arranged between said rotatable member and said impeller for directing ventilating medium inwardly towards said rotatable member, a field exciting winding on said stationary member, an auxiliary armature winding magnetically associated with said housing baffle and having a relatively small arcuate span, means including a rotatable relatively narrow pole field member arranged to excite magnetically said auxiliary armature winding for generating an interrupted voltage of peaked wave form in said auxiliary armature winding, and means connecting said auxiliary armature winding to said field exciting winding for minimizing the effects of residual magnetism and hysteresis in said machine.

5. A dynamo-electric machine having a stationary member and a rotatable member, a ventilating medium impeller driven by said rotatable member, a housing arranged about said impeller and having an annular radially extending baffle of magnetic material arranged between said rotatable member and said impeller for directing ventilating medium inwardly towards said rotatable member, field exciting windings on said stationary member arranged to provide successively arranged poles of alternately reversed polarity, an auxiliary armature winding magnetically associated with said impeller housing baffle and having a relatively small arcuate span, means including a rotatable relatively narrow permanent magnet field member driven by said rotatable member and arranged to excite magnetically said auxiliary armature winding, and means for energizing said field exciting windings by the voltage generated in said auxiliary armature winding for minimizing the effects of residual magnetism and hysteresis in said machine.

6. A dynamo-electric machine having a stationary member and a rotatable member provided with a winding and a commutator connected thereto, means including a primary set of commutator brushes and a secondary set of commutator brushes displaced from said primary brush set for providing a primary circuit and a secondary circuit respectively through said rotatable member, a field exciting winding on said stationary member, an auxiliary stationary member of magnetic material, an auxiliary stationary armature winding magnetically associated with said auxiliary stationary member, means including a rotatable permanent magnet field member driven in a predetermined speed relationship to said rotatable member and arranged to excite said auxiliary stationary member for generating a voltage of peaked wave form in said auxiliary armature winding, and means for energizing said field exciting winding by the voltage induced in said auxiliary armature winding for minimizing the effect of residual magnetism and hysteresis in said machine.

7. A dynamo-electric machine having a stationary member provided with salient pole pieces, field exciting windings on said pole pieces arranged to provide half as many primary poles and half as many secondary poles as the number of said pole pieces, a rotatable member provided with a winding and a commutator connected thereto, means including a primary set of commutator brushes and a secondary set of commutator brushes displaced from said primary brush set for providing a primary circuit and a secondary circuit respectively through said rotatable member, auxiliary field exciting windings on said stationary member pole pieces arranged to provide alternately reversed polarity to adjacent pole pieces, an auxiliary stationary member of magnetic material, an auxiliary stationary armature winding magnetically associated with said auxiliary stationary member, means including a rotatable field member arranged to excite magnetically said auxiliary stationary member for generating a voltage of peaked wave form in said auxiliary armature winding, and means connecting said auxiliary armature winding to said auxiliary field exciting winding for minimizing the effect of residual magnetism and hysteresis in said machine.

FRANK W. MERRILL.